US005687477A

United States Patent [19]

Soriano

[11] Patent Number: 5,687,477

[45] Date of Patent: Nov. 18, 1997

[54] APPARATUS FOR AUTOMATIC MANUFACTURE OF WIRING HARNESSES

[75] Inventor: Louis Soriano, Aubagne, France

[73] Assignee: The Whitaker Corporation, Wilmington, Del.

[21] Appl. No.: 725,690

[22] Filed: Oct. 3, 1996

Related U.S. Application Data

[63] Continuation of Ser. No. 78,287, Jun. 22, 1993, abandoned.

[30] Foreign Application Priority Data

Dec. 18, 1990 [FR] France .................................. 90 16625

[51] Int. Cl.[6] ............................ H01R 43/20; B23P 19/00

[52] U.S. Cl. ................................ 29/872; 29/857; 29/755; 414/786

[58] Field of Search ............................ 29/755, 857, 872; 414/772, 786

[56] References Cited

U.S. PATENT DOCUMENTS

| | | | |
|---|---|---|---|
| 5,083,369 | 1/1992 | Cerda | 29/857 |
| 5,153,839 | 10/1992 | Cross | 29/755 X |
| 5,205,329 | 4/1993 | Suzuki et al. | 29/755 X |
| 5,355,581 | 10/1994 | Soriano | 29/857 |

FOREIGN PATENT DOCUMENTS

| | | |
|---|---|---|
| 0045123 | 2/1982 | European Pat. Off. . |
| 0302804 | 2/1989 | European Pat. Off. . |
| 0359686 | 3/1990 | European Pat. Off. . |
| 2607653 | 3/1988 | France . |

*Primary Examiner*—Carl J. Arbes
*Attorney, Agent, or Firm*—Driscoll Niwa

[57] ABSTRACT

A method of automatically manufacturing cable harnesses, and an apparatus and assembly for implementing the method. The assembly includes a main conveyor capable of transporting wires by means of transfer clamps, a secondary conveyor capable of transporting unique transfer trays, themselves capable of receiving at least one component. Transfer trays are loaded into the secondary conveyor, where they pass through a component loading station for receiving components, then the trays travel to an insertion zone. The insertion zone includes a device for transferring the loaded trays from the secondary conveyor to the main conveyor, where the components receive the wire ends for forming the cable bundles. The formed bundles are then transferred away from the insertion zone by the main conveyor.

9 Claims, 6 Drawing Sheets

APPARATUS FOR AUTOMATIC MANUFACTURE OF WIRING HARNESSES

This application is a continuation of application Ser. No. 08/078,287 filed Jun. 22, 1993, now abandoned, in turn, a 371 of application Ser. No. PCT/FR91/01020 filed Dec. 17, 1991.

BACKGROUND OF THE INVENTION

The present invention relates to a method and apparatus for automatically manufacturing wiring harnesses.

Wiring harnesses are already used for fitting to numerous industrial or domestic electrical equipment, e.g. such as washing machines, cars, . . .

Wiring harnesses are made up of a plurality of electrically conductive wires which are held together by means of collars made of plastic or of adhesive tape, so as to form a set of electrical links ready for connection and fixing onto a support. Each of the wires is initially cut to the desired length, then stripped, and its ends may be crimped to a terminal or inserted in a component (connector, socket, . . . ) depending on the requirements.

Harness manufacturethen consists in bundling together the wires prepared in this way and in inserting their ends in components, after which the bundle formed in this way is held together by binding means such as a collar or adhesive tape.

Methods and apparatuses are already known for automatic manufacture of wires that are cut to desired lengths, stripped, and crimped, e.g. as in U.S. Pat. No. 4,877,228, which describes and claims clamps for the conveyor of an automatic wiring machine conveyor, the clamps being intended to hold one or more wires. Also known are methods and apparatus for mechanically crimping terminals on the ends of an electric wire, and for automatically connecting crimped connections on wires or on electrical components.

French Patent 2,607,653, of which this patent is based, describes and claims apparatus which includes a conveyor that connects a station where the components for manufacture of a harness are fed to an automatic insertion unit having two carriages that are movable in three directions.

Known methods and apparatuses possess numerous drawbacks. One known shortfall is that most machines are capable only of making simple harnesses that include very few connectors or components.

In addition, most machines generally use insertion tooling that is specific to each type of component and to each type of end to be inserted.

SUMMARY OF THE INVENTION

One of the objects of the present invention is to automatically manufacture portions of wiring to harnesses or entire wiring harnesses that have components of types that are very varied in their volume, their mass, their outside shape, and their type of connection.

Another object of the present invention is to manufacture machines that are easy to modify at low cost and which are able to adapt to changes in the types of components used, and to be able to adapt to harnesses that use varying numbers of different components.

Another object of the present invention is to provide a fully automated manufacture of wiring harnesses that require little or no manual handling of the components and tooling required for working on the components.

Still another object of the present invention is to be able to manufacture harnesses at a high rate, without changing tooling.

A final object of the present invention is to automatically manufacture wiring harnesses that enable ends of said wires to be inserted in angular positions distributed around a horizontal axis.

A solution to the above objects consists in providing an apparatus for manufacturing wiring harnesses comprising wires having ends that are to be inserted in recesses of components, the apparatus having at least one main conveyor capable of transporting said wires by means of transfer clamps attached to the conveyor and further including at least one secondary conveyor capable of transporting a plurality of transfer trays. Each of the trays is capable of receiving at least one of said components, and a portion of said secondary conveyor is situated in an insertion zone in which there is also situated a portion of said main conveyor. The apparatus of the present invention further includes at least one loading station along said secondary conveyor for automatically loading said components onto said transfer trays, and the loading station includes means for transferring said transfer trays from said secondary conveyor to said main conveyor.

Each station includes at least one loading support, at least one output pusher, at least one input pusher, and at least one component pusher, thereby making it possible to load said components automatically onto said transfer trays.

A plurality of transfer tray feed conveyors, preferably of the accumulation type, include a means for feeding said secondary conveyor with transfer trays that were previously disposed on said feed conveyors, and said means for transferring said transfer trays from said secondary conveyors to said main conveyor include at least one insertion support, which is capable of moving vertically along an axis $ZZ_2$.

The main conveyor is a linear conveyor having a substantially horizontal longitudinal axis $XX_1$, and said secondary conveyor is a linear conveyor having a substantially horizontal longitudinal axis $YY_1$ and said longitudinal axes $XX_1$ and $YY_1$ are substantially perpendicular to each other. The main conveyor and said secondary conveyor include respective cog belts that are capable of imparting motion to said transfer trays.

Each of said transfer trays includes a base having a bottom face provided with studs that are capable of co-operating with said main conveyor and with said secondary conveyor. The base is connected by means of a stand to a plate, and said transfer trays include at least one holding jig suitable for co-operating with at least one of said components, wherein the holding jig is fixed on said tray. The transfer trays also include means for securing said components against said holding jigs so that at least one of said components can be loaded onto said transfer tray by translational movement, parallel to the substantially horizontal plane of said plate.

The holding jigs include at least one thrust face wherein at least one of said faces of the components can be brought to bear against at least one of its faces, with said holding jigs including a means for applying pressure on at least one other face of each of said components such that said components can be secured and held on said transfer trays, wherein said pressure means preferably includes a spring means.

The studs on each transfer tray are spaced apart in the longitudinal direction at a longitudinal pitch $E_1$, while studs are also spaced apart in the transverse direction at a transverse pitch $E_2$. The longitudinal pitch is a multiple of the pitch $E'_1$ of the cogs on said secondary conveyor, while said transverse pitch is a multiple of the pitch $E'_2$ of the cogs on said main conveyor.

The orienting station for orienting said ends of said wires is situated along said main conveyor, and upstream from said insertion zone. It includes at least one orienting clamp, capable of rotating about an orienting axis $YY_2$ that is substantially perpendicular to said main conveyor.

Each of the transfer trays includes at least one temporary end support such that it is possible to fix one of said wire ends on said temporary end support, and said transfer trays being open on their front faces such that it is easy to insert said wire ends in said recesses for wires in the components previously loaded into said transfer tray. The transfer trays are also open at their rear faces so that it is easy to gain access to the rear ends of the conductor elements of the said previously loaded component.

A solution to the problem posed also consists in providing a method of manufacturing a wiring harness which utilizes the assembly described immediately above.

BRIEF DESCRIPTION OF THE DRAWINGS

The numerous advantages provided by the invention will be better understood from the following description which references the accompanying drawings, wherein.

DETAILED DESCRIPTION OF THE PREFERRED EMBODIMENT

Figure 1:
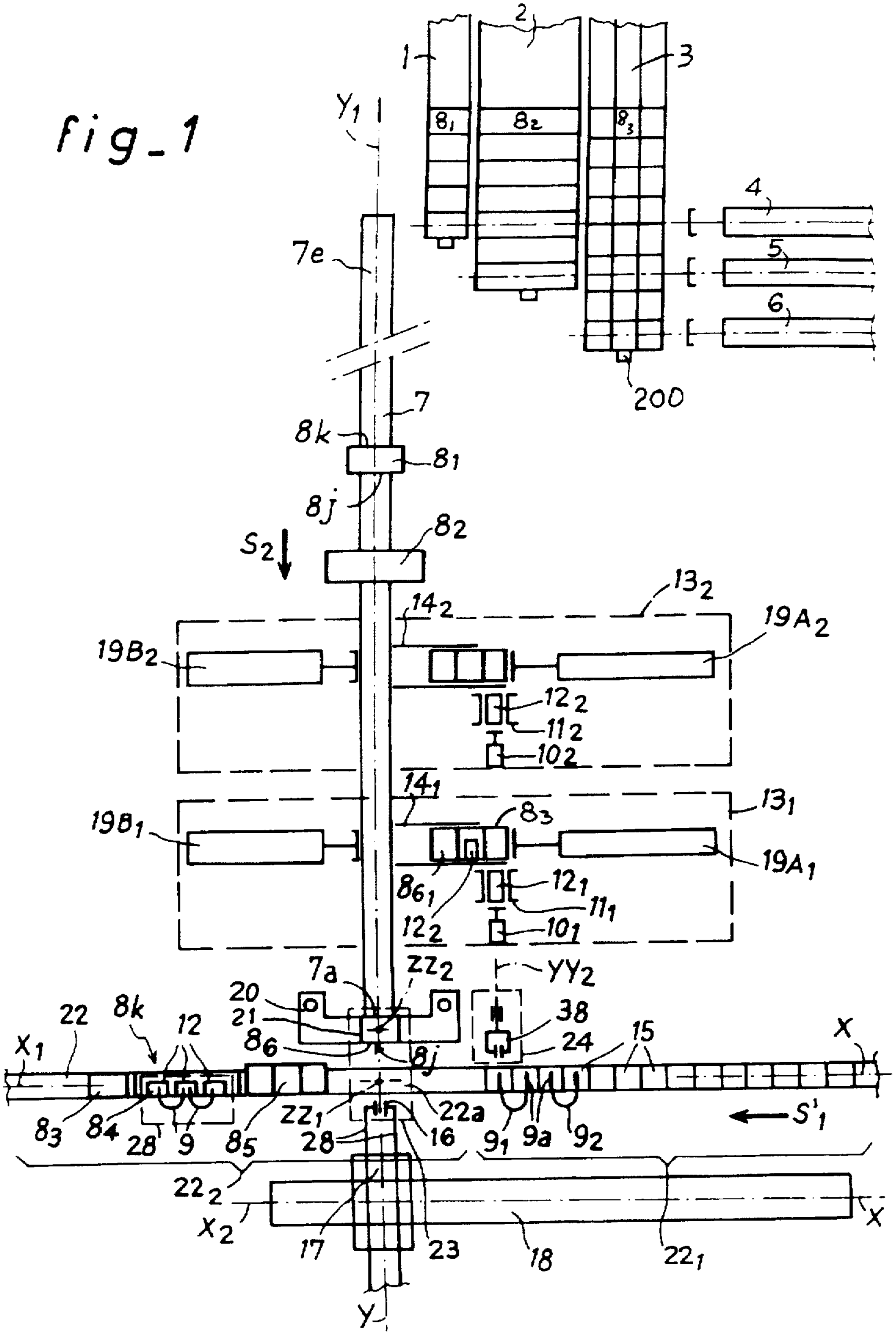
FIG. 1 is a diagrammatic plan view of a particular embodiment of an apparatus of the invention.

FIG. 1 is a diagrammatic plan view showing the main components of apparatus of the invention for manufacturing wiring harnesses. The apparatus comprises a main conveyor 22 having an insertion zone 23 in which zone there may be in operation an insertion means 29 having one or more insertion clamps 16 that have jaws 28. The clamps 16 can move perpendicularly to the longitudinal axis $XX_1$ of said main conveyor, along an axis $YY_1$ by means of a carriage 17 traveling on a carriage support 18 that has an axis $XX_2$ which is parallel to said axes $XX_1$. Said main conveyor 22 shown in the figure is a "linear" conveyor which includes transfer clamps 15 that move along the direction of the arrow designated $S'_1$. The upstream portion of said main conveyor from said insertion zone 23 is provided with said transfer clamps for displacing wires $9_1$, $9_2$ along said displacement direction $S'_1$ past stations such as conventional automatic crimping stations (not shown). According to the invention, the automatic manufacturing apparatus includes a secondary conveyor 7 which is preferably a linear conveyor disposed on the axis $YY_1$, substantially perpendicular to said longitudinal axis $XX_1$ of said main conveyor. The secondary conveyor 7 includes a portion 7*a* which is situated in said insertion zone, which portion 7*a* defines one end of said secondary conveyor. It can be seen that two stations $13_1$ and $13_2$ are provided along said secondary conveyor 7 for automatically loading components onto said transfer trays 8.

It can also be seen that feed conveyors (1, 2, 3) are provided in the proximity of the second end 7*e* of said secondary conveyor 7.

Advantageously, said feed conveyors (1, 2, 3) are smooth-belt accumulating conveyors provided at one of their ends with respective abutments 200 and on which reserves of transfer trays 8 are disposed, the transfer trays preferably being empty. It can be seen in the figure that said feed conveyor 1 is designed to receive a narrow type of transfer tray $8_1$, that said feed conveyor 2 is designed to receive another type of transfer tray $8_2$ that is wider, and that said feed conveyor 3 is designed to receive yet another type of transfer tray $8_3$. Each of said feed conveyors 1, 2, 3 is normally fed with a reserve of identical transfer trays. It can be seen that automatic means are advantageously provided for transferring said transfer trays from each of said feed conveyors 1, 2, 3, to said secondary conveyor 7, which means are represented by pushers (4, 5, 6). Said pushers (4, 5, 6), which may be controlled by a central control device for the manufacturing apparatus, are each capable of transferring a respective transfer tray previously disposed on the corresponding feed conveyor (1, 2, 3) onto said secondary conveyor 7. It can be seen that on said secondary conveyor 7, three transfer trays ($8_1$, $8_2$, $8_3$) are shown. Said transfer trays $8_1$ and $8_2$ which are situated upstream from said automatic component loading stations $13_1$ and $13_2$ are preferably empty. In the special case of components that are very bulky or of components of very complex outside shape, it may be advantageous to load said components manually into one of the types of transfer trays 1, 2, or 3, and to place said transfer trays manually on one of the respective feed conveyors 1, 2, or 3. It should be understood that said transfer trays $8_1$, $8_2$, and $8_3$ are capable of moving on said secondary conveyor in the direction of arrow $S_2$, because said secondary conveyor is-also a cog belt type. It can be seen that on said automatic loading station $13_1$, one of said transfer trays $8_3$ which has previously been conveyed by said secondary conveyor has arrived face to face through a loading support $14_1$ and has been transferred from the second conveyor to said loading support $14_1$ by a pusher $19B_1$. It can be seen that said transfer tray $8_3$ has previously been provided with a first connector $12_2$ from said loading station $13_2$ and that said transfer tray is in the process of being loaded on said automatic loading station $13_1$ with a second connector or component $12_1$ by means of a component pusher $10_1$ and a component guide $11_1$. Once said component $12_1$ has been loaded onto said transfer tray $8_3$, through action of said pusher $10_1$ operating along an axis $YY_2$ that is parallel to said axis $YY_1$, the pusher $19A_1$ of said automatic loading station can transfer said transfer tray $8_3$ back onto said secondary conveyor 7. It could also be seen in this figure that each of said transfer trays includes a front face 8*j* and a rear face 8*k*, which front and rear faces are named relative to the forward travel direction of said secondary conveyor designated by arrow $S_2$. At the end of said secondary conveyor 7, in said insertion zone 23, it can be seen that transfer means 20 are provided for transferring said transfer trays 8 from said secondary conveyor 7 to said main conveyor 22. Said transfer means 20 comprises in particular, a transfer support 21 suitable for moving along an axis $ZZ_2$ that is substantially vertical to horizontal axis $XX_1$, or perpendicular to the plane of the figure. It can be seen that according to the invention, said secondary conveyor 7 delivers said transfer trays 8 to said transfer means comprising said transfer support 20 in such a manner that said front faces 8*j* of said transfer trays 8 are facing said insertion means 29; and in particular the said insertion clamp 16. On said automatic component loading stations $13_1$, $13_2$, said components 12 are loaded in such a manner that the face that is to receive said ends of said wires are situated at the front face of said transfer trays. It can be seen that a station 24 for orienting the ends 9*a* of said wires $9_1$ and $9_2$ is advantageously provided along said main conveyor 22 upstream from said insertion zone 23. Said end orienting station 24 is provided with an orienting clamp 38 capable of rotating about an axis $YY_2$, which is perpendicular to the longitudinal axis $XX_1$ of said main conveyor 22 and substantially parallel to said axis $YY_1$. This makes it possible to position the ends of said wires angularly in such a manner as to enable them to be inserted in said angular positions into recesses in said components situated on said transfer trays 8. On said main conveyor 22, downstream from the insertion zone 23, there can be seen transfer trays $8_4$ and $8_5$ which have previously been loaded with said components and which have been transferred from said secondary conveyor 7 onto which position said insertion which position said insertion means 29 have inserted wires 9 into the recesses of said components situated on said transfer trays 8, thereby building up a harness or a portion of a harness. After that, said transfer means 20 transfers said transfer trays 8 from said secondary conveyor to the insertion zone 22*a* of said main conveyor, and the main conveyor 22 can then convey said transfer trays $8_4$ and $8_5$ fitted with said wires 9 whose ends are inserted in said components 12 for the purpose of building up a harness 28 or a portion of a harness, towards a downstream zone of said main conveyor for storage or utilization. In an alternative embodiment of the said main conveyor, it is naturally possible to provide a first and separate upstream main conveyor 22, which delivers said wires provided with connections at their ends to said insertion zone 23, and a downstream and second main conveyor $22_2$ for removing said transfer trays on which said components have been placed, and on which said ends of said wires have been inserted in order to make up said harnesses or portions of harnesses.

Figure 2:
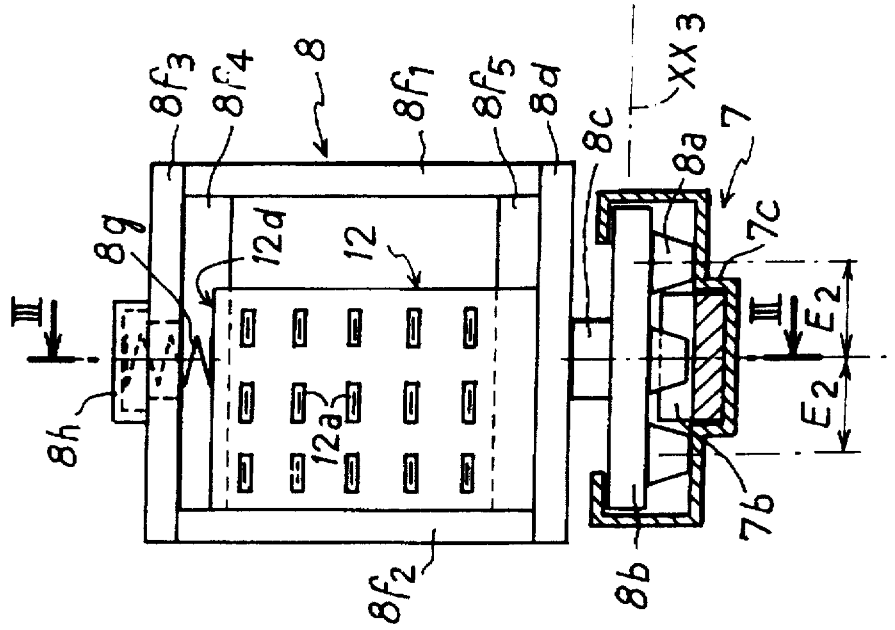
FIG. 2 is a front view of a component transfer tray.

FIG. 2 is a front view showing one embodiment of a transfer tray 8 in accordance with the invention and which gets placed on said secondary conveyor 7. In this embodiment, it can be seen that said secondary conveyor is mainly constituted by a generally channel section member 7*c* providedwith a groove in which a toothed or cog belt 7*b* can slide, thereby enabling said transfer trays to be driven because of the special configuration of their bases. It can be seen that each of said transfer trays includes a base 8*b* whose bottom portion is provided with studs 8*a* that may be substantially trapazium-shape in section, which base 8*b* is surmounted by a column-shaped stand 8*c* connecting said base to a substantially horizontal plate 8*d*. Supporting templates or jigs $8f_1$, $8f_2$, $8f_3$ are provided on said plate 8*d* and serve to hold respective components 12 in predetermined positions, each of components 12 having respective recesses 12*a* in their front faces in which male connections are found, and onto which female connections are to be inserted, for example, which female connections have previously been crimped onto the ends of wires.

FIG. 2 also shows that said studs 8*a* of said base 8*b* are spaced apart at a transverse pitch $E_2$ along a transverse axis $XX_3$. Supporting jigs $8f_4$ and $8f_5$ can also be seen provided on said plate. Supporting jig $8f_3$ includes means for applying pressure on a face 12*d* of said component 12, which pressure-applying means comprises a spring 8*g* that bears against said face 12*d* and that is received within and supported by a cap 8*h* fixed to said supporting jig $8f_3$.

Figure 3:
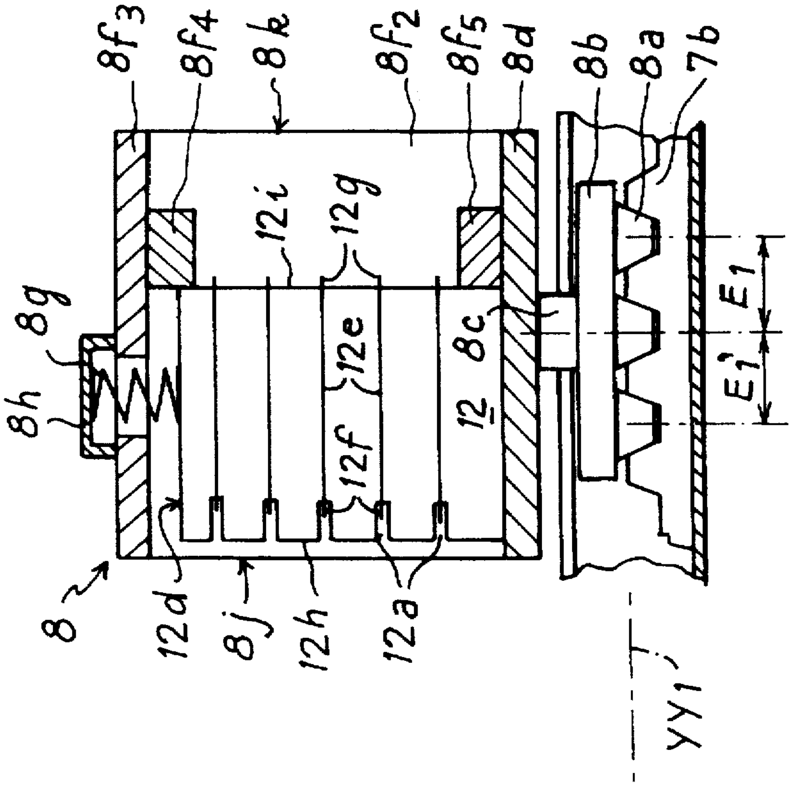
FIG. 3 is a section view on III—III of FIG. 2.

In FIG. 3, which is a view taken along line III—III of FIG. 2, it can be seen that said component 12 stands on said plate 8*d* of said transfer tray and that said component includes conductor elements 12*e*, each having one end 12*f* opening out into said recesses 12*a* of each of said components 12 and an opposite end 12*g* opening out to the rear face 12*i* of said component. As shown in FIG. 2, it can be seen in FIG. 3 that the top face 12*d* of said component is in contact with said spring 8*g* held by said cap 8*h* fixed to said supporting jig $8f_3$. Said supporting jigs $8f_4$ and $8f_5$ are fixed respectively to said supporting jig $8f_3$ and to said plate 8*d*, so as to prevent said component 12 moving relative to said transfer tray along the longitudinal axis $YY_1$ of said transfer tray. It can also be seen that said studs 8*a* of said transfer tray base 8*b* are substantially trapezium-shaped in section and are longitudinally spaced apart at a distance $E_1$, and that said cogs 7*b* of said cog belt are longitudinally spaced apart at a distance $E'_1$, which is such that studs 8*a* are complementarily received between said cogs 7*b*.

Figure 4:
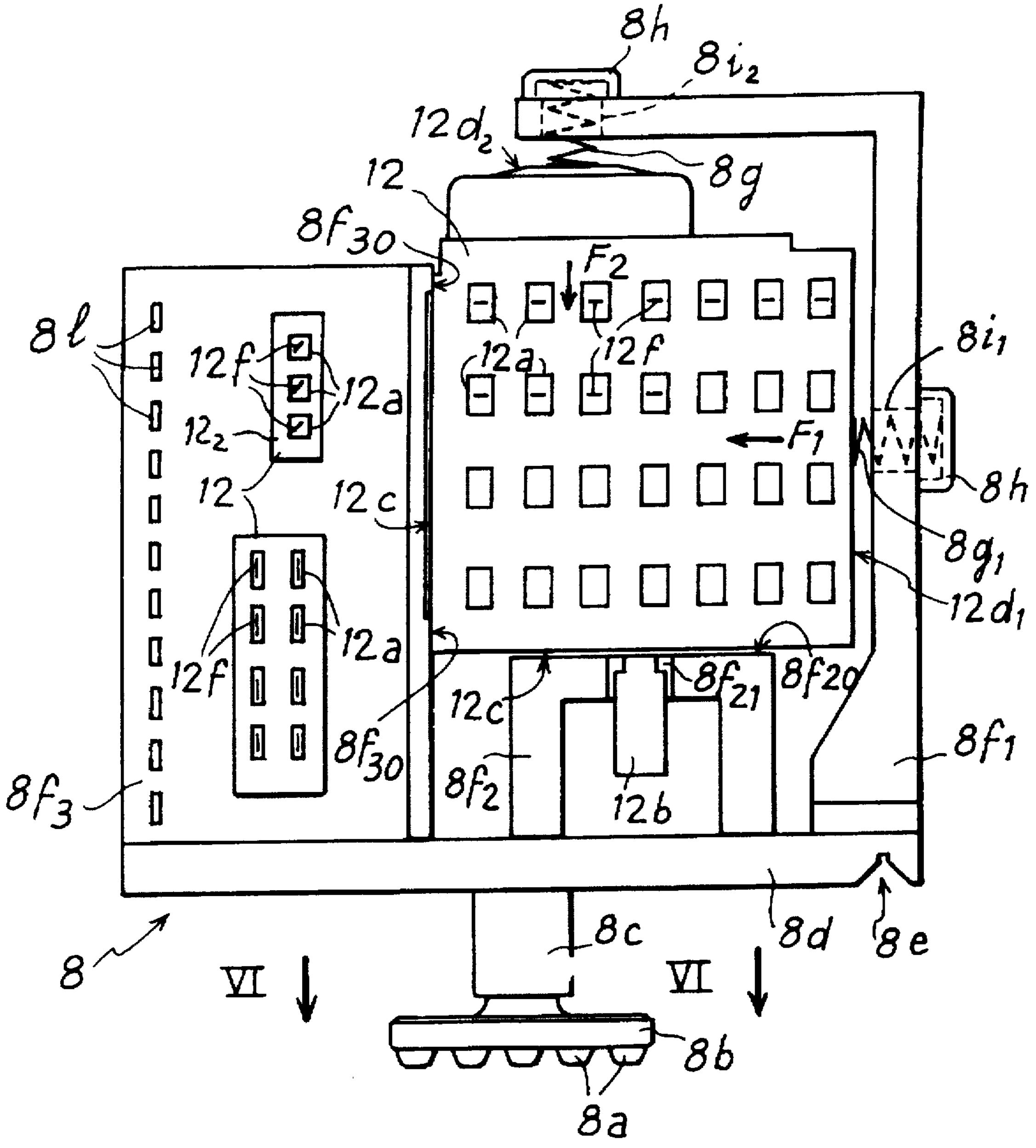
FIG. 4 is a front view of another embodiment of a component transfer tray in accordance with the invention.

In FIG. 4, there is seen another embodiment of the transfer tray 8 of the apparatus of the invention. It can be seen that said transfer tray 8 comprises a plate 8*d* which may be provided with a reference for positioning said transfer tray, which reference is embodied by a notch 8*e*. It can be seen that said plate surmounts a stand 8*c* which connects said plate to a base 8*b* provided with studs 8*a*. Above said tray there can be seen holding jigs $8f_1$, $8f_2$, and $8f_3$, said holding jig 8*f* being in the form of a bracket, said holding jig $8f_2$being in the form of an arch provided with a slot $8f_{21}$, and said holding jig $8f_3$ being in the form of a vertical plate. As a result, said jigs $8f_1$ and $8f_2$ make it possible to position a component 12 of complex shape on said plate, with a portion 12*b* of the component projecting and being received in said slot $8f_2$ provided in said holding jig $8f_{21}$. Said holding jigs $8f_1$and $8f_2$ are designed specifically to receive said complex component as shown in FIG. 4. It can be seen that said holding jig $8f_1$ is provided on its side and top faces with two bores $8i_1$ and $8i_2$ each receiving respective springs 8*g* and 8*g* that bear against two corresponding faces $12d_1$ and $12d_2$ of said component 12 so as to exert pressure on said faces of said component, each of said springs being held by a respective plug $8h_1$ and $8h_2$. As a result, each of said springs 8*g* exert a force represented by arrows $f_1$ and $f_2$ respectively urging said component against faces $8f_{20}$ and $8f_{30}$ provided on said holding jigs $8f_2$ and $8f_3$ respectively, thereby securing said complex shaped component 12. It can also be seen that two other components $12_1$ and $12_2$ provided with recesses 12*a* containing male connections 12*f* can also be fixed on said holding jig $8f_3$. It can also be seen that a plurality of temporary, end supports 81 are provided on said holding jig $8f_3$.

In FIG. 4, said transfer tray 8 is shown in front view, such that the front face of said transfer tray corresponds with the front faces of said components 12 that have been loaded onto said transfer tray.

Figure 5:
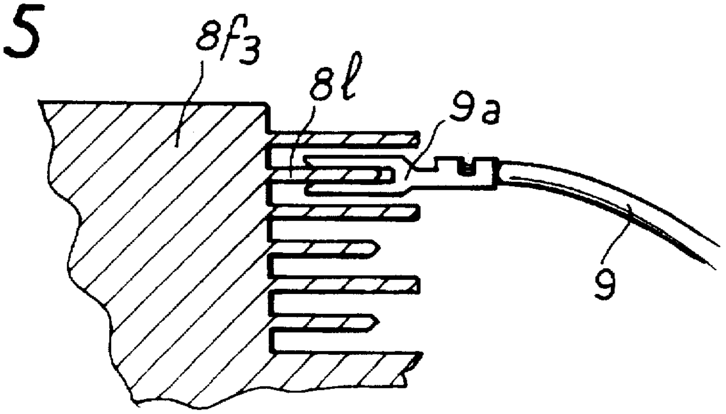
FIG. 5 is a section view showing a detail of the FIG. 4 transfer tray.

FIG. 5 is a section through an embodiment detail of said holding jig 8*f*, shown on said transfer tray 8 of FIG. 4. It can be seen that said holding jig $8f_3$ is provided with temporary end supports 81 on which connections 9*a* can be installed, which connections are crimped to the ends of wires 9.

Figure 6A:
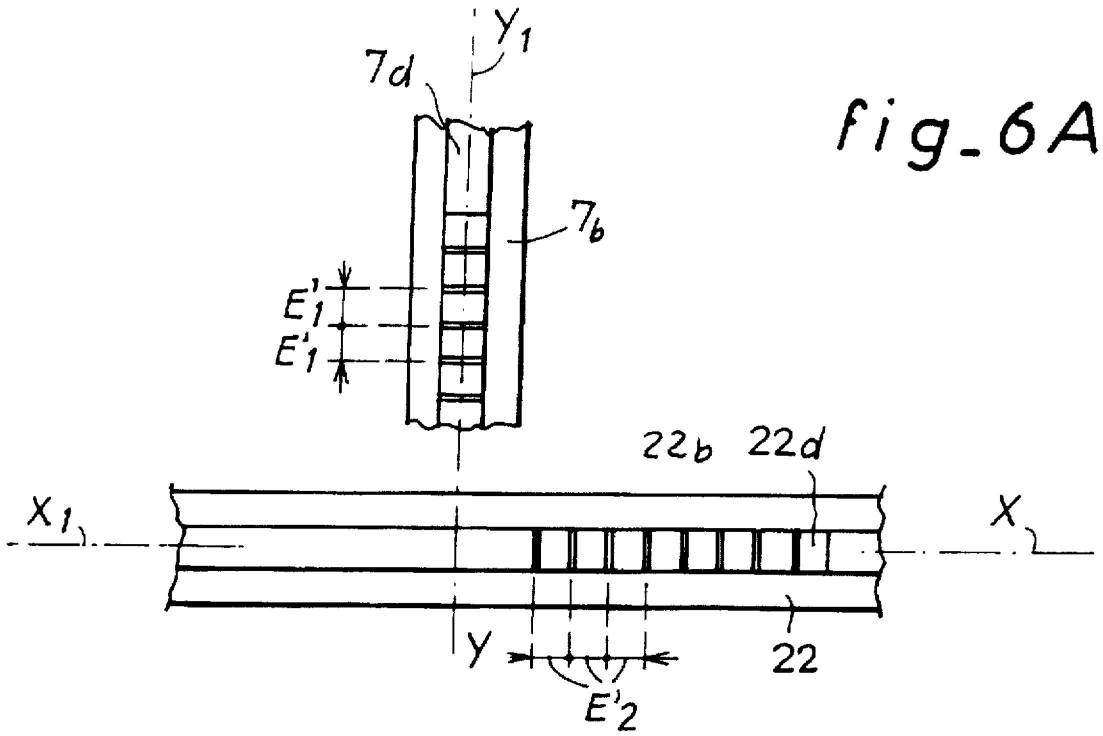
FIGS. 6*a* and 6*b* are fragmentary diagrammatic views respectively of the conveyors and of the contact studs of a transfer tray in accordance with the invention.
Figure 6B:
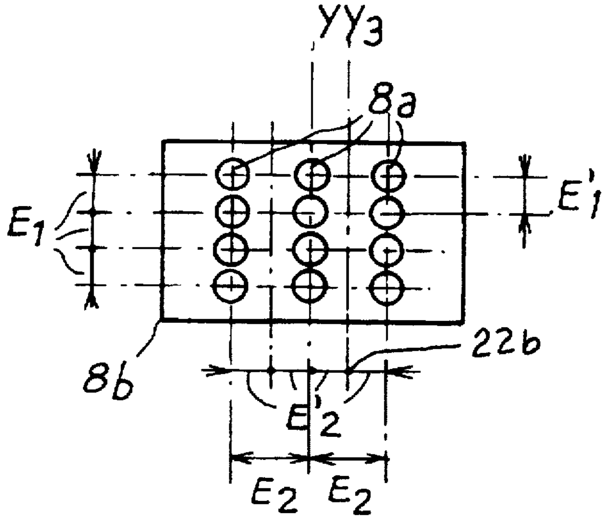

FIGS. 6*a* and 6*b* show a preferred embodiment of the apparatus of the invention, in which said main conveyor 22 is provided with a cog belt 22*d* whose cogs 22*b* are spaced apart along said longitudinal axis $XX_1$ of said main conveyor at a longitudinal distance $E'_2$, and similarly said secondary conveyor 7 is provided with a cog belt 7*d* whose cogs 7*b* are spaced apart along said longitudinal axis $YY_1$ of said secondary conveyor 7 at a distance $E'_1$. It can be seen, advantageously in FIG. 6*b*, that said base 8*b* of said transfer tray 8 is provided with studs 8*a* which are spaced apart at a transverse distance $E_2$ and that are spaced apart at a longitudinal distance $E_l$. It can be seen that in this embodiment said transfer distance $E_2$ of said studs is equal to twice said distance $E'_2$ of said cogs 22*b* of said cog belt 22*d* of said main conveyor 22, and that said longitudinal distance $E_1$ of said studs 8*a* is equal to said distance $E'_1$ of said cogs 7*b* of said cog belt 7*d* of said secondary conveyor 7, as a result said transfer tray provided with said base 8*b* fitted with the studs 8*a* as shown in FIG. 6*b* can be driven by said studs 8*a* meshing with said cogs 7*b* of said cog belt 7*d* of said secondary conveyor 7 up to said transfer means 20, after which said transfer tray 8 can be transferred onto said main conveyor 22, said transfer tray then being driven by said studs 8*a* meshing with said cogs 22*b* of said cog belt 22*d* of said main conveyor 22.

Figure 7:
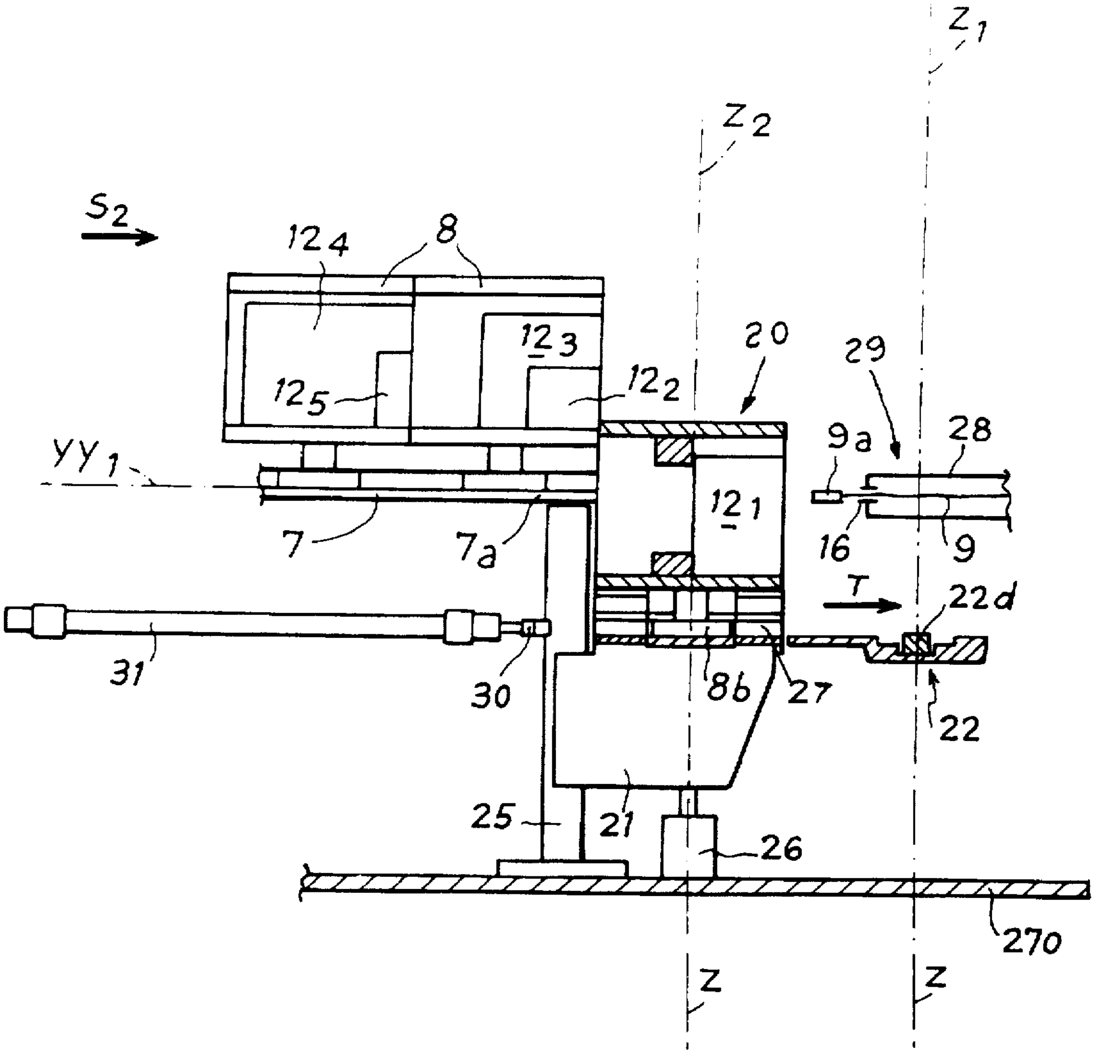
FIG. 7 is a side view of transfer means in accordance with the invention.

FIG. 7 is a diagram showing transfer means 20 enabling said transfer trays 8 to be transferred from said secondary conveyor 7 (shown in part) to said main conveyor 22 (also shown in part). FIG. 7 shows that said secondary conveyor 7 which extends along said longitudinal axis $YY_1$ has conveyed said transfer trays 8 in the direction of arrow $S_2$, which trays are provided with said connectors 12 and have reached said end 7*a* of said secondary conveyor, i.e. said ends situated in said insertion zone. It can be seen that said transfer means 20 for transferring said transfer trays from said secondary conveyor to said main conveyor includes a transfer support 21 which can move along a substantially vertical axis $ZZ_2$ through operation of displacement means 26 which is preferably a mechanical actuator that includes a stepper motor and a screw-and-nut assembly, and guide means 25. Said guide means and said drive means may be fixed, for example, to a work surface 270. Advantageously, said transfer support 21 may be provided with locking means 27 for locking said transfer tray 8 on said transfer support 21 so as to secure said transfer tray 8 on said transfer support and prevent it from moving. As a result, said transfer support can move along a vertical axis $ZZ_2$ so as to cause one of said recesses 12*a* of said component 12 on said transfer tray to coincide vertically with the position on said vertical axis $ZZ_1$ of said insertion clamp 16, which can then insert said end 9*a* of a wire 9 in said recess 12*a*. When said insertion means 29, including said insertion clamp 16, have inserted said ends of said wires in said component 12 situated on said transfer tray as held by said transfer support (with the help of vertical displacements of said transfer support 21), said locking means 27 are unlocked so as to enable said transfer tray to be transferred onto said main conveyor 22 provided with said cog belt 22*d*, with said transfer being provided by an ejector pusher 31 provided with a rod 30 capable of pushing said transfer tray 8, along arrow T, with said transfer tray subsequently being conveyed by said cog belt 22*d* which co-operates with said base 8*b* of said transfer tray through said studs 8*a*, as previously described.

Figure 8:
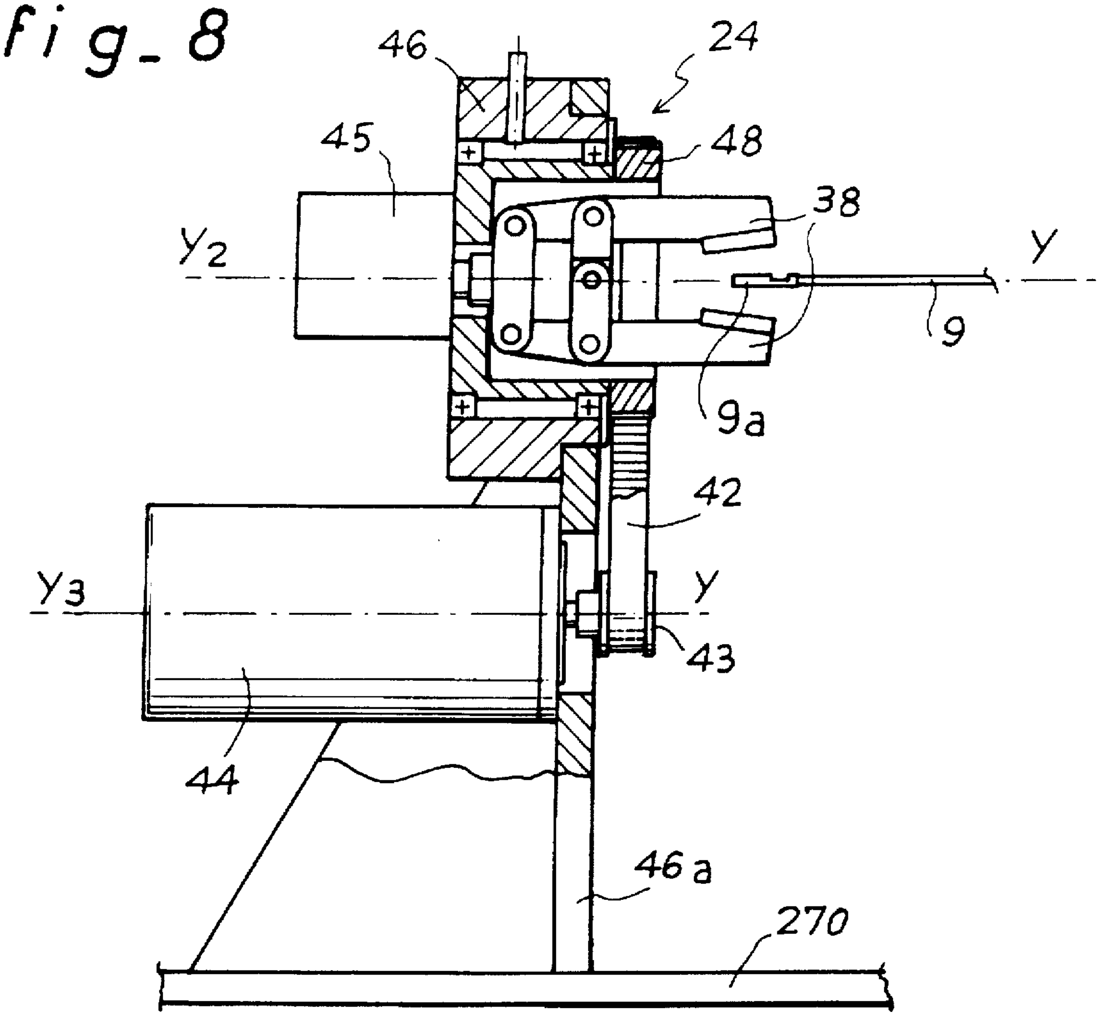
FIG. 8 is a longitudinal section through an end orienting device in accordance with the invention.

FIG. 8 is a fragmentary section through a device 24 for orienting the ends of the wires. It can be seen that said device 24 for orienting the ends 9*a* of said wires 9 includes a clamp defined by two jaws 38, which are capable of grasping an end 9*a*, said clamp also being capable of rotating about said axis $YY_2$ under drive from a motor 44 which drives it via a pulley 43 and a belt 42. The figure also shows a support 48 for said clamp, which support 48 receives said clamp and is capable of rotating about said axis $YY_2$, e.g. in ball bearings, thereby enabling said support 48 to rotate relative to a fixed support 46 which may be fixed to said work surface 270.

Advantageously, means 45 are provided for actuating said jaws 38 of said clamp so as to cause them to open or close, depending on requirements.

I claim:

1. A method of manufacturing a wiring harness having a plurality of wires with wire ends, said ends to be inserted in recesses of components, comprising the steps of:

a) providing at least one main conveyor capable of transporting said wires by means of a plurality of clamps transfer claims situated on said main conveyor;

b) providing at least one secondary conveyor capable of transporting a plurality of transfer trays, said transfer trays being suitable for receiving at least one of said components, a portion of said secondary conveyor being situated in an insertion zone having a portion of said main conveyor situated herein;

c) providing at least one loading station along said secondary conveyor, said loading station being equipped with a supply of identical components;

d) disposing at least one transfer tray on said secondary conveyor, said transfer tray being provided with a holding jig for holding said components disposed in said loading section;

e) actuating said secondary conveyor to position said transfer tray into a location corresponding with one of said loading station;

f) transferring said transfer tray onto said loading station and loading said transfer tray with at least one of said components; with which said loading station is equipped wherein a front face of said component is aligned adjacent to a front face of said transfer tray;

g) transferring said transfer tray back onto said secondary conveyor from said loading station;

h) actuating said secondary conveyor so as to place said transfer tray fitted with said component in said insertion zone and; wherein said front face of said transfer tray faces said insertion means;

i) inserting by an insertion means, the ends of said wires previously disposed in said transfer clamps into said recesses of said components loaded said transfer tray; and j) transferring said transfer tray on said main conveyor.

2. A machine, for manufacturing wire harnesses comprising wires having ends assembled to components, the machine comprising:

a linear main conveyor having an insertion zone, an insertion zone, and upstream portion on one side of the insertion zone, and a downstream portion on an opposing side of the insertion zone;

clamps for holding the wires, the clamps being transportable by the upstream portion of the main conveyor past wire end processing stations to the insertion zone; a secondary conveyor having a portion at the insertion zone; a loading station arranged alongside the secondary conveyor; trays for holding the components, the transfer trays transportable by the secondary conveyor from the loading station where the components are loaded automatically onto the transfer trays, to the insertion zone;

insertion means disposed at the insertion zone for assembling the wires which are transported to the insertion zone by the clamps, to the components which are transported on the transfer trays to the insertion zone.

3. The machine according to claim 2 wherein said loading station comprises at least one loading support for receiving said transfer tray thereon and at least one input pusher for pushing said transfer tray from said secondary conveyor onto said support, and at least one output pusher, wherein said components are loaded automatically onto said transfer trays and pushed off said support by said output pusher, back onto said secondary conveyor.

4. The machine according to claim 3 further comprising at least one accumulation transfer tray feed conveyor disposed at an end of said secondary conveyor remote from the insertion zone for feeding said secondary conveyor with transfer trays previously disposed on said main conveyor.

5. The machine according to claim 2 wherein each of said transfer trays comprises a base having a top and a bottom face, said bottom face including studs which cooperate with upstanding cogs of a conveyor belt of said main conveyor when said tray is on said main conveyor, said studs cooperating with upstanding cogs on said secondary conveyor, said top face of said base including a vertically disposed stand, said stand connected to a horizontally disposed plate, said transfer trays further including at least one holding jig mounted on said plate, said jig cooperates with at least one of said components so as to hold said component to said tray, said transfer trays further including means for securing said components against said holding jigs.

6. The machine according to claim 5, wherein each of said holding jigs have at least one thrust face, against which at least one of said faces of said components bears against each of said holding jigs including a means for applying a biasing pressure on at least one other face of each of said components, said biasing means comprises of a spring whereby said components can be secured and held to said transfer trays by said spring.

7. The machine according to claim 5 wherein said studs are longitudinally and transversely spaced apart from each other, spacing being a multiple of spacing of said cogs of said secondary conveyor, said transverse spacing being a multiple of said spacing of said cogs of said main conveyor.

8. The machine according to claim 2 further comprising an orienting station for orienting said ends of said wires, said orienting station being located along said main conveyor between said upstream end and said insertion zone, said orienting station having at least one orienting clamp capable of rotating about an orienting axis that is substantially perpendicular to said main conveyor.

9. The machine according to claim 5 wherein at least one of said transfer trays has at least one temporary end support for temporary fixation of one of said ends of one of said wires on said temporary end support, said ends of said wires being subsequently insertable in said recesses in components previously loaded into said transfer tray.

* * * * *